United States Patent
Nakagawa et al.

[19]

[11] Patent Number: 5,963,391
[45] Date of Patent: *Oct. 5, 1999

[54] SERVO INFORMATION WRITING SYSTEM

[75] Inventors: Masayoshi Nakagawa; Makoto Moriya, both of Fukushima-ken, Japan

[73] Assignee: Alps Electric Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/799,672

[22] Filed: Feb. 11, 1997

[30] Foreign Application Priority Data

Feb. 16, 1996 [JP] Japan .................................. 8-029376

[51] Int. Cl.[6] .................................................. G11B 21/02
[52] U.S. Cl. ................................................. 360/75; 360/51
[58] Field of Search .................................. 360/77.05, 51, 360/75, 77.08, 77.02

[56] References Cited

U.S. PATENT DOCUMENTS

| | | | |
|---|---|---|---|
| 4,896,228 | 1/1990 | Amakasu et al. | 360/77.05 X |
| 5,012,363 | 4/1991 | Mine et al. | 360/77.05 |
| 5,193,036 | 3/1993 | Green et al. | 360/77.05 X |

*Primary Examiner*—Andrew L. Sniezek
*Attorney, Agent, or Firm*—Brinks Hofer Gilson & Lione

[57] ABSTRACT

The present invention intends to provide a servo information writing system capable of writing servo information to an information recording disk received in a cartridge and having a relatively small storage capacity, without design modification of the disk and without decrease in storage capacity of the disk. To this end, the servo information writing system comprises: a disk loading portion for loading thereon an information recording disk received in a cartridge and for rotating the disk when the disk is loaded thereon; a hard disk to which clock information is written and which rotates together with the disk loading portion; a head disposed in proximity to the information recording disk as loaded on the disk loading portion to write servo information to the disk; a head disposed in proximity to the hard disk to exchange clock information with the hard disk; and a servo information forming section for forming servo information with the clock information read by the latter head as a cycle and supplying the thus-formed servo information to the former head.

2 Claims, 2 Drawing Sheets

SERVO INFORMATION WRITING SYSTEM

BACKGROUND OF THE INVENTION

1. Field of the Invention

The present invention relates to a servo information writing system and more particularly a servo information writing system which, even with no clock information stored in an information recording disk received in a cartridge, can write to the information recording disk servo information corresponding to the state of rotation of the disk in the cartridge when the cartridge is loaded into the writing system.

2. Description of the Related Art

Heretofore, for writing servo information to a magnetic recording medium such as a hard disk, there has been used such a servo information writing system as will be mentioned. First, using a clock head, clock information is written to an area of the magnetic recording medium which area is not used for the recording of data, for example, the outermost peripheral area and then the clock information is reproduced by a clock head to obtain the clock information (clock pulse).

With the clock information thus obtained as a cycle, a servo information writing head writes servo information to a sector head on the magnetic recording medium.

In this connection, reference is here made to FIG. 2, which is a schematic configuration diagram showing an example of configuration of a known servo information writing system.

As shown in FIG. 2, the known servo information writing system comprises a magnetic recording medium for example a hard disk 21, a spindle motor 22, a disk loading portion 23 connected to the spindle motor 22 for rotating the hard disk 21 as loaded onto the disk loading portion, a clock head (first head) 24 for writing clock information to the hard disk 21 and reading the clock information written in the hard disk 21, pattern signal (servo information) writing heads (second head) 25 for writing a pattern signal (servo information) to a second predetermined area of the hard disk 21, and a pattern signal generator (servo information forming section) 26 which receives the clock information read by the clock head 24, generates a pattern signal (servo information) based on the clock information and supplies the pattern signal (servo information) to the pattern signal (servo information) writing heads 25.

The servo information writing system having the above configuration operates in the following manner.

After the hard disk 21 has been loaded onto the disk loading portion 23, the spindle motor 22 is rotated to rotate the disk loading portion 23 which is connected to the rotating shaft of the spindle motor, with the result that the loaded hard disk 21 also rotates at the same time. At this time the clock head 24 writes clock information to an area of the hard disk 21 which area is not used for the recording of data, for example the outermost peripheral area. Then, the hard disk 21 with the clock information thus written therein is rotated by the operation of the spindle motor 22, while the clock information written in the hard disk 21 is read by the clock head 24 and the thus-read clock information is fed to the pattern signal generator 26. With the clock signal thus fed as a cycle, the pattern signal generator 26 forms a pattern signal (servo information) and transmits the thus-formed pattern signal (servo information) to the pattern signal writing heads 25, which in turn write the pattern signal to a sector head of a track on the hard disk 21. In this way there is performed writing of a required pattern signal (servo information) to the hard disk 21.

According to the recent trend, it has become popular to use a magnetic recording medium, e.g. a 3.5-inch floppy disk in which an information recording medium is accommodated within its cartridge case, together with a hard disk.

In such a 3.5-inch floppy disk, a shutter is provided in an opening portion of the cartridge case to prevent deposition of dust and the like on the surface of the information recording medium. For writing or reading information, the shutter is opened and a magnetic head is brought into contact with the information recording medium to write or read information to or from the information recording medium.

For writing servo information to such a 3.5-inch floppy disk by using the foregoing conventional servo information writing system, it is required to keep open the shutter disposed in the opening portion of the cartridge case and bring both the clock head 24 and pattern signal writing head 25 into contact with the information recording medium through the opening portion, with the result that the available data area in the information recording area is narrowed by an amount corresponding to the width which the clock head 24 occupies, thus giving rise to a problem that the storage capacity of the information recording medium is decreased.

If a second opening to be used exclusively for the clock head 24 is formed in the cartridge case and the clock head 24 is contacted with the information recording medium through the second opening, the above-mentioned decrease in storage capacity may be avoided. However, if the second opening is formed in the cartridge case and a second shutter is provided in the second opening, there will arise another problem that the number of components so much increases and hence the manufacturing cost of the 3.5-inch floppy disk rises.

There also is known other means for solving the problem in question. According to this means, a precision type encoder is attached to a drive shaft for rotating the magnetic recording medium at the time of loading of the same medium and clock information is obtained from information read by the precision type encoder during rotation of the magnetic recording medium, thereby omitting the use of the clock head 24. However, this means involves another problem that the precision encoder is usually expensive and cannot freely select its clock frequency.

SUMMARY OF THE INVENTION

The present invention solves the above-mentioned problems and it is an object of the invention to provide a servo information writing system capable of writing servo information to an information recording disk of a relatively small information storage capacity without its design modification and without decrease in its storage capacity.

According to the present invention, in order to achieve the above-mentioned object, there is provided a servo information writing system having means which comprises: a disk loading portion for loading thereon of an information recording disk received in a cartridge and for rotating the disk when the disk is loaded thereon; a disk-like member to which clock information is written and which rotates together with the disk loading portion; a first head disposed in proximity to the information recording disk as loaded on the disk loading portion to write servo information to the information recording disk; a second head disposed in proximity to the disk-like member to exchange clock information with the disk-like member; and a servo information forming section for forming servo information with the clock information read by the second head as a cycle and supplying the thus-formed servo information to the first head.

In the above means, it is preferable that the disk-like member be constituted by a hard disk through which is centrally inserted a central shaft of a spindle motor connected to the disk loading portion.

In the above means, moreover, a floppy disk or a removable hard disk is used as the information recording disk received in the cartridge.

The adoption of the above means is advantageous in that since it is not necessary to bring both the servo information writing head and clock head into contact through an opening of the cartridge with the information recording disk received in the cartridge, the area of the disk employable for information recording is no longer narrowed and therefore the information storage capacity of the disk is not decreased.

The adoption of the foregoing means is further advantageous in that the system can be applied to the information recording disk received in the cartridge as it is without design modification of the cartridge structure for the disk, that is, there is no fear of increase in the manufacturing cost of the disk.

DESCRIPTION OF A PREFERRED EMBODIMENT

An embodiment of the present invention will be described in detail hereinunder with reference to the accompanying drawings.

Figure 1:
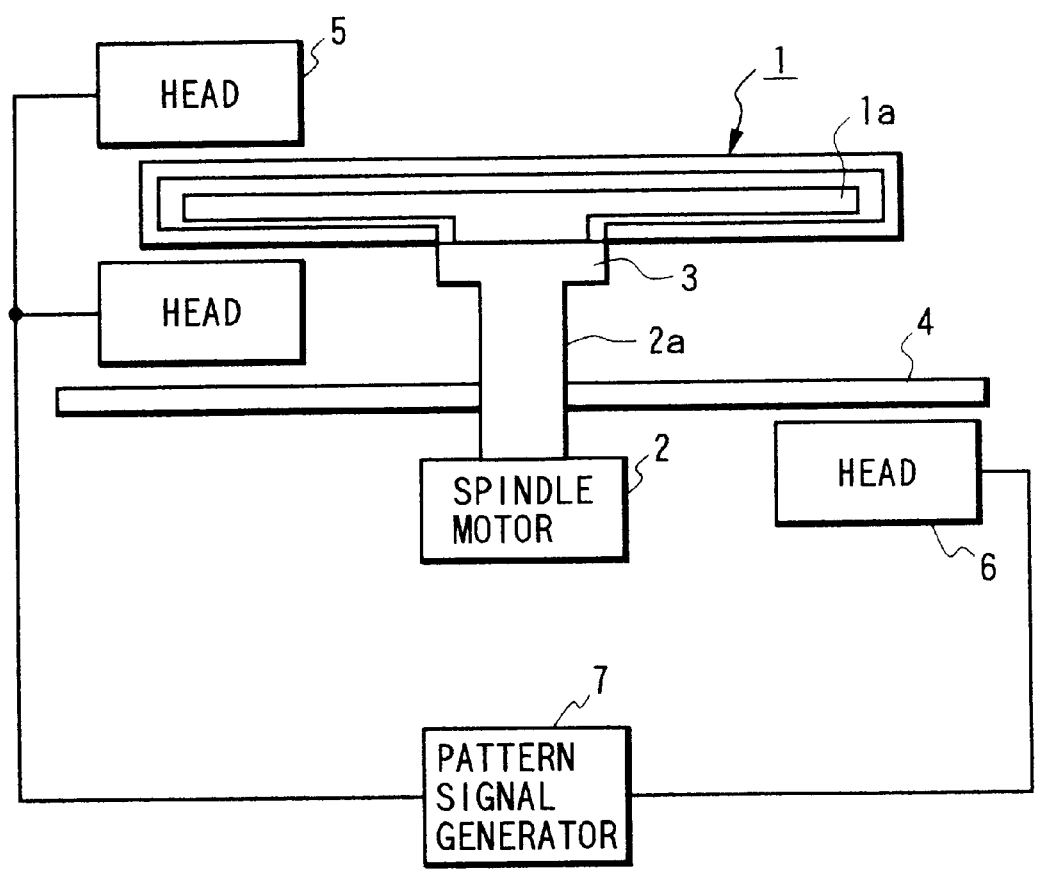
FIG. 1 is a schematic configuration diagram of a servo information writing system according to an embodiment of the present invention.
Figure 2:
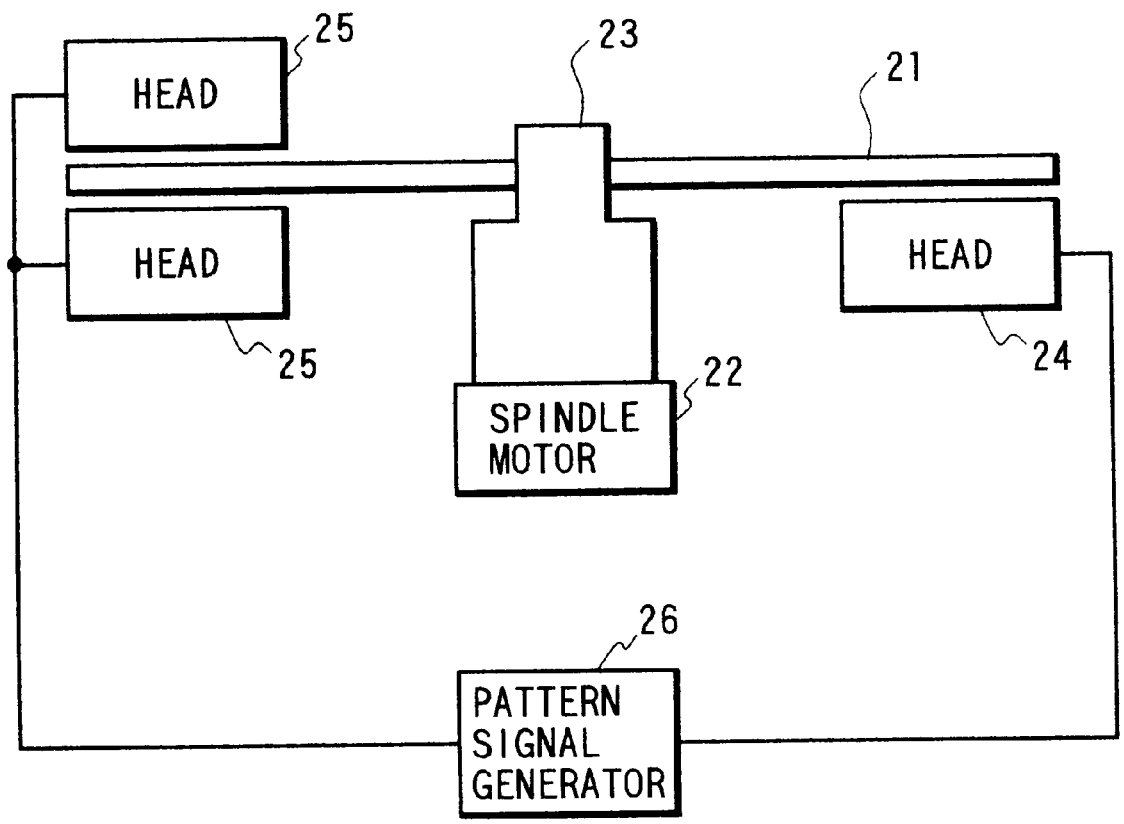
FIG. 2 is a schematic configuration diagram showing an example of a known servo information recording system.

FIG. 1 schematically illustrates the configuration of a servo information recording system embodying the invention.

As shown in FIG. 1, the servo information writing system of this embodiment is for use with an information recording disk received in a cartridge, for example a floppy disk 1a received in a cartridge 1. The servo information writing system comprises: a spindle motor 2; a disk loading portion 3 connected to a rotating shaft 2a of the spindle motor 2 to rotate the floppy disk 1a received in the cartridge 1 when the floppy disk is loaded thereon; a clock information recording medium, for example a hard disk 4, to which clock information can be written and which is centrally fitted on the rotating shaft 2a of the spindle motor 2 and is adapted to rotate integrally with the disk loading portion 3; servo information writing heads (first head) 5 disposed in proximity to the floppy disk 1a as loaded on the disk loading portion 3 in its accommodated state in the cartridge 1 to write a pattern signal (servo information) to the floppy disk 1a; a clock head (second head) 6 disposed in proximity to the hard disk 4 to write and read clock information to and from the hard disk 4; and a pattern signal generator (servo information forming section) 7 which receives the clock information read by the clock head 6, generates a pattern signal (servo information) with the received clock information as a cycle and transmits the thus-generated pattern signal (servo information) to the servo information writing heads 5.

The servo information writing system of this embodiment having the above-described configuration operates as follows.

When the spindle motor 2 is driven to rotate the disk loading portion 3 connected to the rotating shaft 2a of the spindle motor 2 after the floppy disk 1a received in the cartridge 1 has been loaded onto the disk loading portion 3, the thus-loaded floppy disk 1a rotates with rotation of the disk loading portion 3. The hard disk 4 which is centrally fitted on the rotating shaft 2a of the spindle motor 2 also rotates as the disk loading portion 3 rotates. During this rotation, the clock head 6 first writes clock information to the hard disk 4, thereafter reads clock information stored in the hard disk and sends it to the pattern signal generator 7. With the thus-fed clock signal as a cycle, the pattern signal generator 7 forms a pattern signal (servo information) and transmits the thus-formed pattern signal (servo information) to the pattern signal writing heads 5, which in turn write the pattern signal (servo information) to a sector head region of a track on the floppy disk 1a being rotated. Thus there is performed writing of the pattern signal (servo information) to the floppy disk 1a.

In the servo information writing system of this embodiment as described above, it is not necessary that both the servo information writing heads (first head) 5 and clock head (second head) 6 for writing or reading clock information be brought into contact through an opening of the cartridge 1 with the floppy disk 1a received in the cartridge. It suffices for the servo information writing heads (first head) 5 alone to be contacted with the floppy disk 1a. That is, the information recording area of the floppy disk 1a does not become narrower, with no decrease in the storage capacity of the floppy disk 1a.

Moreover, the servo information writing system of this embodiment permits application thereof directly to the floppy disk 1a received in the cartridge 1 without design modification of the cartridge 1 for the disk 1a. Accordingly, it is possible to avoid increase in the manufacturing cost of the disk received in the cartridge.

Further, since the servo information writing system of this embodiment employs as the clock head (second head) 6 a head which writes and reads clock information to and from the head disk 4, it becomes possible to change arbitrarily the clock frequency of the clock information to be written to the hard disk 4.

Although in the above embodiment the hard disk 4 is used as the disk-like member for writing and reading clock information, the disk-like member used in the invention is not limited to the hard disk. There may be used any other medium insofar as the medium is a disk-like medium capable of writing and reading information.

Although in the above embodiment the floppy disk 1a received in the cartridge 1 is used as the information recording disk referred to in the invention, the information recording disk in question is not limited thereto, but it may be any other similar disk, for example a removable hard disk received in a cartridge.

Additionally, the structure of the disk loading portion 3 may be modified so that a hard disk not received in a cartridge can be used instead of the floppy disk 1a received in the cartridge, though this point does not fall under the scope of the servo information writing system of the invention. According to such a modification, when a hard disk with no clock information prestored therein is loaded onto the disk loading portion 3, a pattern signal (servo information) corresponding to the state of rotation of the loaded hard disk can be written to the hard disk in the same manner as in the above embodiment.

According to the servo information writing system of the present invention, as set forth hereinabove, it is not necessary that both the servo information writing head (first head) and clock head (second head) be brought into contact with the information recording disk received in the cartridge through the opening of the cartridge, but it suffices for only the servo information writing head (first head) to be contacted with the information recording disk. Therefore, the information recording area of the information recording disk does not become narrow and hence there is no decrease in the storage capacity of the disk.

According to the servo information writing system of the present invention, since the information recording disk received in the cartridge can be loaded to the system as it is without structural modification of the disk, there is obtained an effect that the manufacturing cost of the disk is not increased.

Further, according to the servo information writing system of the present invention, since a head capable of exchanging clock information with the disk-like member is used as the clock head (second head), the clock frequency of clock information which is written to the disk-like member can be changed as desired.

What is claimed is:

1. A servo information writing system comprising:
    a disk loading portion for receiving a floppy disk cartridge therein and rotating a floppy disk stored in said cartridge;
    a clock information recording medium rotatable in synchronism with the rotation of said floppy disk;
    a clock head for writing and reading clock information on said clock information recording medium;
    a pattern signal generator for generating servo information based on said clock information read by said clock head; and
    at least one servo information writing head movable to access said floppy disk rotating in said disk loading portion and write said servo information thereon.

2. A servo information writing system according to claim 1, wherein said clock information recording medium is a hard disk with a rotating shaft of a spindle motor being inserted centrally therethrough.

* * * * *